April 3, 1962 — O. V. PAYNE — 3,027,624
INSERTED BIT-CLAMPING MEANS
Filed Oct. 30, 1958

Inventor
Oscar V. Payne
by Roberts, Cushman & Grover
Attys

United States Patent Office 3,027,624
Patented Apr. 3, 1962

3,027,624
INSERTED BIT-CLAMPING MEANS
Oscar V. Payne, Leicester, Mass., assignor to The O. K. Tool Company, Inc., Milford, N.H., a corporation of New Hampshire
Filed Oct. 30, 1958, Ser. No. 770,708
2 Claims. (Cl. 29—105)

This invention relates to tools of the replaceable bit type and more particularly to clamping means for mounting a bit in a holder such as the head of a milling cutter for example.

Objects of the invention are to provide a tool which is simple and economical in construction, which holds the bit firmly in position, in which the position of the bit may be adjusted accurately and quickly, and which is durable and reliable in use.

In one aspect the invention involves a tool comprising a holder having a recess with an outlet through each of two adjacent faces of the holder and, in the recess a clamp including two parts for gripping therebetween a bit which projects from the recess beyond both of the aforesaid faces, one of the parts having a bit seat facing toward one of the outlets and the other part having a bit seat facing the other outlet, the positions of the seats determining the extent to which the bit projects through the two outlets respectively, together with means for adjusting one of the parts transversely of its seat to vary the extent the bit projects through the corresponding outlet. Preferably the bit is clamped between the aforesaid parts by means of a wedge between the holder and one of the parts. In the preferred embodiment the parts are semicylindrical and together form substantially a cylinder, the holder recess also being cylindrical.

In another aspect the means for adjusting one of the parts transversely of its seat and the means for clamping the parts together are accessible from adjacent faces of the holder respectively, preferably the two faces beyond which the bit projects.

Figures 1, 2:
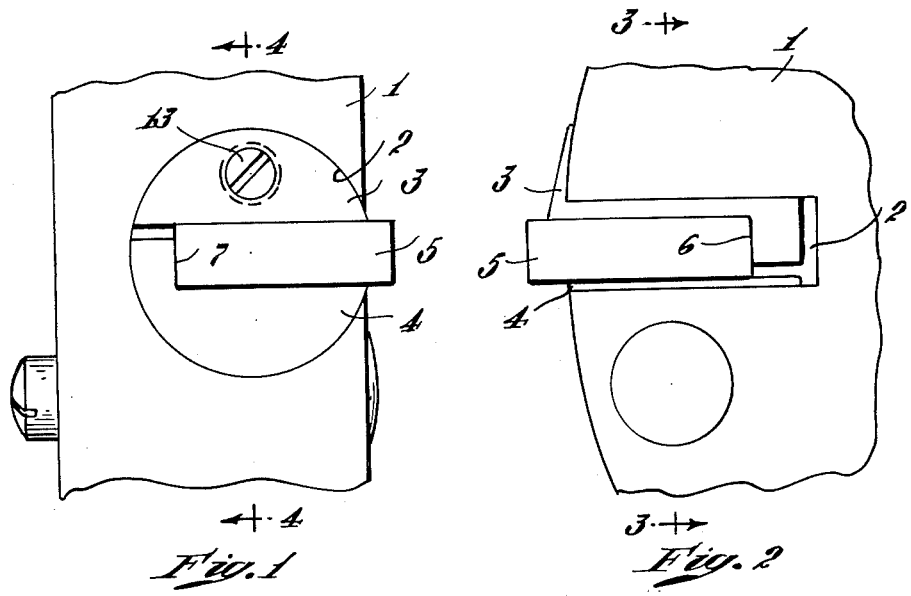
Figures 3, 4:
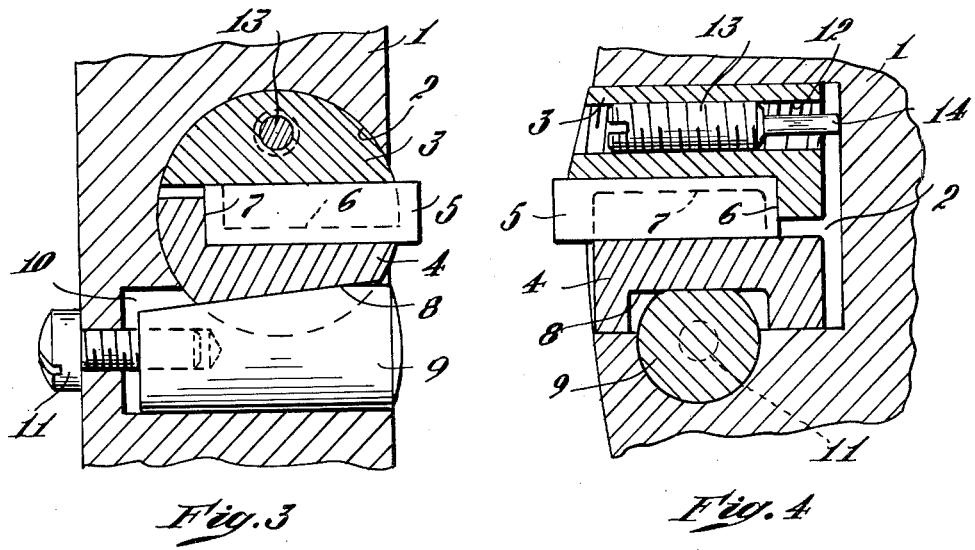

For the purpose of illustration typical embodiments of the invention are shown in the accompanying drawings in which FIG. 1 is a side view;
FIG. 2 is an end view;
FIG. 3 is a section on line 3—3 of FIG. 2;
FIG. 4 is a section on line 4—4 of FIG. 1; and
FIG. 5 is a view like FIG. 3 showing a modification.

The particular embodiment of the invention shown in FIGS. 1 to 4 comprises a rotary holder 1 such as a milling head containing a cylindrical recess 2 having its axis extending radially of the holder 1, the recess opening through both the peripheral face of the head and also through the end face. Fitting in the recess is a clamp comprising two semicylindrical parts 3 and 4 for clamping a bit 5 therebetween. The part 3 has a seat 6 facing the peripheral outlet of the recess and the part 4 has a seat 7 facing the end outlet. The part 4 is milled out to provide a flat face 8 which inclines away from the bit 5 inwardly from the end face of the head. A cylindrical wedge 9 fits into a cylindrical recess 10 in the holder 1 opposite the flat face 8 of the part 4, the wedge 9 having an inclined flat face seating on the face 8. Extending through the bottom of the recess 10 and threading into the wedge 9 is a screw 11 for drawing the wedge into the recess, thereby to clamp the bit between the two parts 3 and 4. The part 3 has a threaded bore 12 extending parallel to the axis of the recess 2 and threaded into this bore is a screw 13, the reduced end 14 of which bears on the bottom of the recess 2.

Figure 5:
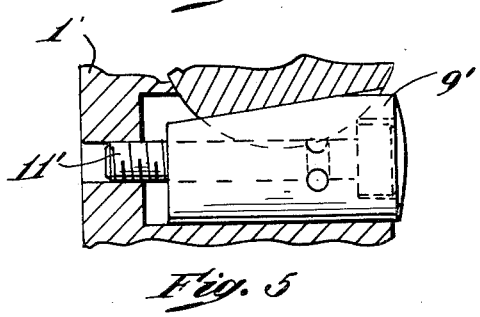

The modification shown in FIG. 5 is like the embodiment shown in FIGS. 1 to 4 except that the screw 11' extends through the wedge 9' and threads into the holder 1'.

To assemble the parts the bit 5 is placed between the parts 2 and 3 in engagement with the seats 6 and 7, after which these parts are slipped into the recess 2. Then the wedge 9 is inserted into the recess 10 and the screw 11 is threaded into the wedge. Before the screw 11 is tightened the part 3 is adjusted by means of the screw 13 until the bit 5 projects the desired distance from the peripheral face of the holder 1, the screw 13 being retracted when the parts are assembled so that the part 3 seats on the bottom of the recess 2. When the bit 5 is resharpened the screw 13 is advanced enough to compensate for the reduction in length of the bit.

From the foregoing it will be evident that the tool of this invention is simple and economical in construction, the bit is held firmly in position, the position of the bit may be adjusted accurately and quickly by means of the screw 13 which adjusts the part 3 transversely of the bit seat 6, and the tool is durable and reliable in use.

It should be understood that the present disclosure is for the purpose of illustration only and that this invention includes all modifications and equivalents which fall within the scope of the appended claims.

I claim:
1. Adjustable bit clamping means comprising a holder having a recess with an outlet through each of two adjacent faces of the holder, in the recess a clamp including two parts having a bit space therebetween and outer faces, one of the parts having a bit seat at one side of said space facing toward one of said outlets and the other part having a bit seat extending transversely of said seat and facing the other outlet, means for adjusting one of the parts transversely of its seat, and a third part constituting a wedge means located and bearing between the holder and the said outer face of one of said parts for forcing the clamp parts together to grip the bit therebetween.

2. Adjustable bit clamping means according to claim 1 further characterized in that said two means are accessible from said adjacent faces respectively.

References Cited in the file of this patent

UNITED STATES PATENTS

| 2,549,251 | Skelton | Apr. 17, 1951 |
| 2,751,663 | Leuzinger | June 26, 1956 |
| 2,859,507 | Knell | Nov. 11, 1958 |

FOREIGN PATENTS

| 808,077 | Germany | July 9, 1951 |
| 1,143,568 | France | Apr. 15, 1957 |